(No Model.)

H. E. THOMAS.
SURF POWER MACHINE.

No. 416,972.  Patented Dec. 10, 1889.

WITNESSES.
M. G. Loefler.
J. A. Vaughan

INVENTOR.
Henry E. Thomas
by Jno. L. Boone
Attorney

UNITED STATES PATENT OFFICE.

HENRY E. THOMAS, OF SAN FRANCISCO, CALIFORNIA, ASSIGNOR OF ONE-HALF TO F. H. HAUSMAN, OF SAME PLACE.

SURF-POWER MACHINE.

SPECIFICATION forming part of Letters Patent No. 416,972, dated December 10, 1889.

Application filed July 19, 1889. Serial No. 318,050. (No model.)

*To all whom it may concern:*

Be it known that I, HENRY E. THOMAS, of the city and county of San Francisco, State of California, have invented an Improved Surf-Power; and I do hereby declare that the following is a full, clear, and exact description thereof.

My invention relates to an improved apparatus for utilizing the inflow and outflow of waves on the shore or beach of a river, ocean, or bay for the purpose of compressing air to be used as a motive power or other purpose for which a current or blast of air can be utilized.

My invention contemplates the location of a water-operated pump for pumping and forcing air at a point in the surf or tide-water where it will be operated by the pulsation of the waves, and also the location of an accumulator or pressure apparatus at some point between said water-operated pump and the place where the forced air is to be utilized, all as hereinafter more fully described.

Figure 1:
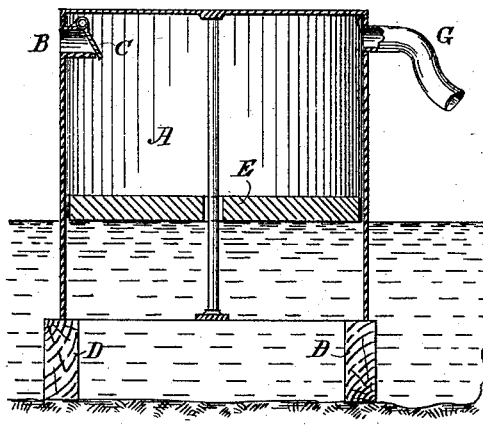
Figure 2:
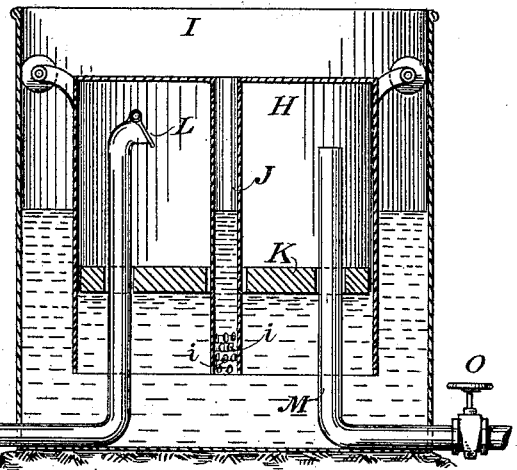
Figure 3:
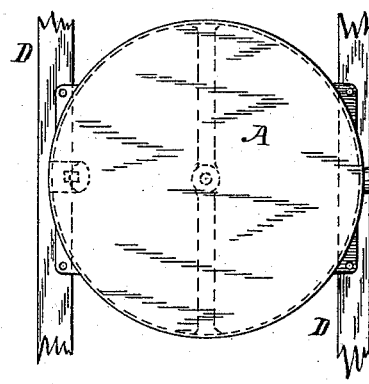
Figure 4:
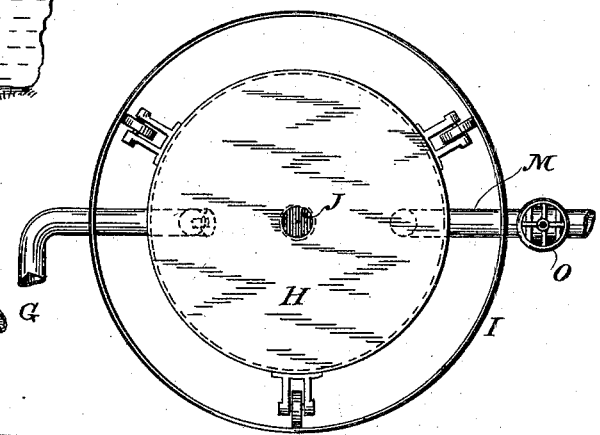

Referring to the accompanying drawings, Figure 1 is a sectional elevation of surf-pump. Fig. 2 is a sectional elevation of the accumulator. Fig. 3 is a plan view of the surf-pump, and Fig. 4 is a plan view of the accumulator.

A represents a rectangular tank or box of any desired size, the top and sides of which are closed, while the bottom is open. In or near the top of this box is an opening B, covered with an inward-opening valve C, which will open and admit air to the interior of the box, but will close against its egress. This tank, or "pump," as I shall hereinafter call it, I place in the surf of the ocean or near the shore of any other body of water, with its open body downward, and mount it upon legs D, so that the mean level of the water will cover its sides to the depth of a foot, more or less. The water will then stand inside the pump at a corresponding mean level. Inside of this tank or box I place a float or loose piston E, which is guided on a vertical rod F, that extends from the top to the bottom of the tank and passes loosely through a hole in the center of the float. This float or piston is made of some light substance or material—such as wood—so that it will float and rest upon the surface of water in the tank and be moved up and down by the pulsation or rise and fall of water as the level in the tank is raised and lowered by the incoming and outgoing wave, and by this action the tank becomes an air-pump, because as the float or piston descends air is drawn into the tank through the valve-opening B, and as it rises the air thus drawn in is forced out through a pipe G, which connects the upper part of the tank with an accumulator or pressure-tank H, which is located at some point between the air-pump and the place where the air is to be utilized. This accumulator or pressure-tank is constructed similar to a gasometer. The outer tank I is an open-top tank, which is partially filled with water, and H is an inner tank, the bottom of which is open and sets down into the water in tank I. A pipe J, having perforations *i* in its lower end, extends from the center of the top of tank H down vertically as far as its lower end extends, and a float K rests upon the water in tank I. This pipe J serves an an outlet for the escape of overpressure of air, or, in other words, it acts as a safety-valve for the accumulator or pressure-tank. The pipe G, which conducts the air from pump A, passes through the side of tank I and up inside of pressure-tank H and terminates above the float K. An outward-opening valve L at the end of this pipe permits the air which is forced into and through the pipe from pump A to flow out into the space above the water in tank H and prevents it from returning from the tank back through the pipe into the pump, so that the continued operation of pump A forces air in small quantities at each stroke into tank H, causing a pressure to accumulate in the tank corresponding to the weight of the tank in the manner of accumulating pressure in gasometers. A pipe M leads from above float K in tank H to the place where the air is to be utilized for power or other purposes, a cock O serving to regulate or cut off the supply through the tank when required.

This apparatus can be used for supplying a continuous forced current of air through long distances. The pumping apparatus can be placed in the surf of the ocean or at any other point where the swell or pulsation of waves will operate the floating piston, while the pressure apparatus or accumulator can be located at any distance from it. Branch pipes can be connected with and led from the main pipe M to various places, and thus simultaneously supply air for driving air-engines for power purposes.

The apparatus is especially adapted for ventilation and cooling purposes, as it takes the fresh and cool air from off the water and delivers it in an uncontaminated condition at the place of discharge. For this reason it is specially applicable for supplying fresh air to dwellings in cities and to hospitals and places where fresh cool air is a necessity.

Having thus described my invention, what I claim, and desire to secure by Letters Patent, is—

1. The combination, with a pump having an inward-opening valve near its upper end and provided with a float or piston operated by tidal power, of a pressure-tank or accumulator consisting of an outer tank having an open top and partially filled with water and an inner tank having an open bottom, a float within said inner tank, and a pipe connecting said pump with said inner tank, all substantially as shown, and for the purposes set forth.

2. The combination, with a pump having an inward-opening valve near its top and provided with a float or piston operated as described, of a pressure-tank or accumulator consisting of an outer tank having an open top, the said tank being partially filled with water, and an inner tank having an open bottom, a float within said inner tank, and a pipe connecting said inner tank and pump together, the said pipe extending through and above said float in the inner tank of the accumulator and provided with an inwardly-opening valve at its extremity within said tank, all substantially as shown, and for the purposes set forth.

3. An air-forcing apparatus consisting of the open-bottom tank A, with its valve-opening B and floating piston E, supported on legs D in the surf of the ocean or other body of water and connected with an accumulator or pressure-tank H I by the transmitting-pipe G, having the valve L in the pressure-chamber, and the conducting and distributing pipe M, all combined and arranged to operate substantially as described.

In testimony whereof I have hereunto set my hand.

HENRY E. THOMAS.

Witnesses:
M. G. LOEFLER,
J. A. VAUGHAN.